United States Patent [19]

Bailey

[11] Patent Number: 5,623,595
[45] Date of Patent: Apr. 22, 1997

[54] METHOD AND APPARATUS FOR TRANSPARENT, REAL TIME RECONSTRUCTION OF CORRUPTED DATA IN A REDUNDANT ARRAY DATA STORAGE SYSTEM

[75] Inventor: William Bailey, Palo Alto, Calif.

[73] Assignee: Oracle Corporation, Redwood Shores, Calif.

[21] Appl. No.: 312,509

[22] Filed: Sep. 26, 1994

[51] Int. Cl.$^6$ .............................. G06F 11/00; G11C 29/00
[52] U.S. Cl. .................................... 395/182.04; 371/40.2
[58] Field of Search .................. 371/10.1, 40.1, 371/40.2, 10.2, 40.4; 395/575, 182.04, 182.05, 182.06, 182.03, 185.07

[56] References Cited

U.S. PATENT DOCUMENTS

| | | | |
|---|---|---|---|
| 5,124,987 | 6/1992 | Milligan et al. | 371/10.1 |
| 5,208,813 | 5/1993 | Stallmo | 371/10.1 |
| 5,239,659 | 8/1993 | Rudeseal et al. | 395/800 |
| 5,258,984 | 11/1993 | Menon et al. | 371/10.1 |
| 5,271,012 | 12/1993 | Blaum et al. | 371/10.1 |
| 5,278,838 | 1/1994 | Ng et al. | 371/10.1 |
| 5,351,246 | 9/1994 | Blaum et al. | 371/10.1 |
| 5,379,417 | 1/1995 | Lui et al. | 395/575 |
| 5,390,187 | 2/1995 | Stallmo | 371/10.1 |
| 5,390,327 | 2/1995 | Lubbers et al. | 395/575 |

OTHER PUBLICATIONS

Chen et al., RAID: High–Performance Reliable Secondary Storage, ACM Computing Serveys, Jun. 1994, at 145.

*Primary Examiner*—Robert W. Beausoliel, Jr.
*Assistant Examiner*—Norman M. Wright
*Attorney, Agent, or Firm*—Blakely, Sokoloff, Taylor and Zafman LLP

[57] ABSTRACT

A method and apparatus for providing transparent, real time reconstruction of corrupted data from a redundant array of storage units in a manner that imposes no performance degradation for reconstruction of such corrupted data and that does not tie up system resources. The present invention is particularly suited to applications in which data is retrieved from storage equipment in approximately equally sized parcels. Each parcel is divided into "N" blocks of data. An "N+1st" parity block for each parcel is derived based on the content of the "N" blocks of data. The "N" blocks of data and the parity block for each parcel are stored in stripes of blocks in a redundancy group consisting of "N+1" data storage units. Data is read from the storage units an entire stripe at a time. To read a stripe, a read request is concurrently sent to each storage unit in the redundancy group, requesting the block of data in that storage unit that corresponds to the stripe being read. Each storage unit independently processes the read request it has received and sends back the requested block as soon as it has been read. As soon as the first "N" blocks are received, they are XOR'd together to reconstruct the outstanding "N+1st" block. The "N" received blocks and the XOR'd sum, representing a reconstruction of the outstanding "N+1st" block, are delivered to the requesting device or process. The same procedure is used each time data is read. The present invention thus delivers data at a consistent rate regardless of whether a storage unit failure occurs.

32 Claims, 6 Drawing Sheets

| TIME | ACTION |
|---|---|
| T1 | REQUEST BLOCK A3 |
| T2 | READ BLOCK A3 |
| T3 | DELIVER BLOCK A3 |
| T4 | REQUEST BLOCK D1 |
| T5 | READ BLOCK D1 |
| T6 | DELIVER BLOCK D1 |
| T7 | REQUEST BLOCK B5 |
| T8 | READ BLOCK B5 |
| T9 | RE-READ BLOCK B5 |
| T10 | RE-READ BLOCK B5 |
| T11 | REPORT BLOCK B5 READ FAILURE |
| T12 | READ BLOCKS B1, B2, B3 AND B4 |
| T13 | XOR BLOCKS B1, B2, B3 AND B4 |
| T14 | DELIVER RECONSTRUCTED BLOCK B5 |
| T15 | REQUEST BLOCK A4 |
| T16 | READ BLOCK A4 |
| T17 | DELIVER BLOCK A4 |

FIG. 3 (PRIOR ART)

| | TIME | ACTION | BLOCKS RECEIVED AND STORED |
|---|---|---|---|
| NO READ ERRORS | T1 | REQUEST READ OF BLOCKS A1-A5 | |
| | T2 | RECEIVE AND STORE BLOCK A4 | A4 |
| | T3 | RECEIVE AND STORE BLOCK A2 | A4, A2 |
| | T4 | RECEIVE AND STORE BLOCK A5 | A4, A2, A5 |
| | T5 | RECEIVE AND STORE BLOCK A1 | A4, A2, A5, A1 |
| | T6 | XOR BLOCKS A1, A2, A4 AND A5 | A4, A2, A5, A1, [A3] |
| | T7 | DELIVER BLOCKS A1, A2, [A3] AND A4 | |
| SINGLE BLOCK READ ERROR (B5) | T8 | REQUEST READ OF BLOCKS B1-B5 | |
| | T9 | RECEIVE AND STORE BLOCK B4 | B4 |
| | T10 | RECEIVE AND STORE BLOCK B2 | B4, B2 |
| | T11 | RECEIVE AND STORE BLOCK B1 | B4, B2, B1 |
| | T12 | RECEIVE AND STORE BLOCK B3 | B4, B2, B1, B3 |
| | T13 | XOR BLOCKS B1, B2, B3 AND B4 | B4, B2, B1, B3, [B5] |
| | T14 | DELIVER BLOCKS B2, B3, B4 AND [B5] | |
| TEMP. COMP. DELAY (SU4) | T15 | REQUEST READ OF BLOCKS C1-C5 | |
| | T16 | RECEIVE AND STORE BLOCK C2 | C2 |
| | T17 | RECEIVE AND STORE BLOCK C5 | C2, C5 |
| | T18 | RECEIVE AND STORE BLOCK C1 | C2, C5, C1 |
| | T19 | RECEIVE AND STORE BLOCK C3 | C2, C5, C1, C3 |
| | T20 | XOR BLOCKS C1, C2, C3 AND C5 | C2, C5, C1, C3, [C4] |
| | T21 | DELIVER BLOCKS C1, C3, [C4] AND C5 | |
| CATASTROPHIC STORAGE UNIT FAILURE (SU1) | T22 | REQUEST READ OF BLOCKS D1-D5 | |
| | T23 | RECEIVE AND STORE BLOCK D4 | D4 |
| | T24 | RECEIVE AND STORE BLOCK D2 | D4, D2 |
| | T25 | RECEIVE AND STORE BLOCK D5 | D4, D2, D5 |
| | T26 | RECEIVE AND STORE BLOCK D3 | D4, D2, D5, D3 |
| | T27 | XOR BLOCKS D2, D3, D4 AND D5 | D4, D2, D5, D3, [D1] |
| | T28 | DELIVER BLOCKS [D1], D2, D4 AND D5 | |

FIG. 4

METHOD AND APPARATUS FOR TRANSPARENT, REAL TIME RECONSTRUCTION OF CORRUPTED DATA IN A REDUNDANT ARRAY DATA STORAGE SYSTEM

BACKGROUND OF THE INVENTION

1. FIELD OF THE INVENTION

The present invention relates to the field of data storage systems, and to a method and apparatus for providing real time reconstruction of corrupted data in a redundant array data storage system.

2. BACKGROUND ART

A typical data storage system involves one or more data storage units that provide data storage and retrieval for a computer or other data processing device. Data storage units may include high capacity tape drives, solid state memory chips, and magnetic, optical, and/or magneto-optical disk drives.

Data storage applications, such as on-line banking systems or video file systems, require nearly 100% reliability of a data storage system. That is, any data sent to the data storage system must be accurately stored, and the data must be accurately delivered from the storage system when requested. Present data storage units are not 100% reliable—instead, they generally have a statistically predictable rate of failure. Such failures range from a localized failure such as the corruption of a single bit of data to a complete failure of the data storage unit.

The consequences of storage system failures range from irretrievable loss of data to delays in the delivery of data while corrupted data is recovered or reconstructed. Irretrievable loss of data is a severe problem for any system. Delays in the delivery of data as it is being recovered or reconstructed may also have severe consequences, particularly where the data that is being delivered by the data storage system consists of long, continuous streams of data whose integrity depends on delivery of the data at a constant rate.

An example of a system in which interruptions in the delivery of data produce unacceptable results is a video file system used for on-demand delivery of full length video programs. In such a system, hundreds of full length videos are stored in digital form in a multi-terabyte data storage system. Video data is retrieved in real time at a customer's request, and delivered via a communications network to the customer for viewing. In this type of system, interruptions in the continuous flow of video data from the data storage system to the customer cause "blips" or other unacceptable deterioration in the quality of the video image being delivered. To deliver a satisfactory product to the end-user, such interruptions must be avoided.

It has been proposed that data storage reliability can be improved by generating error correction information and/or using redundant data storage units. For example, U.S. Pat. No. 5,208,813 to Stallmo for "On-Line Reconstruction of a Failed Redundant Array System" describes a number of different approaches to providing reliable data storage using arrays of redundant, inexpensive, disks. Five different architectures are described under the acronym "RAID" ("Redundant Arrays of Inexpensive Disks").

RAID 1 provides a "mirrored" storage unit for each primary storage unit that keeps a duplicate copy of all data on the primary unit. While RAID 1 systems provide increased reliability, they double the cost of data storage.

In RAID 2 systems, each bit of each word of data, plus "Error Detection and Correction" ("EDC") bits for each word are stored on a separate storage unit (this technique is known as "bit striping"). A RAID 2 system has reliability and a high data transfer bandwidth, since essentially an entire block of data is transferred during the time each disk drive needs to transfer a single bit. However, disadvantages of a RAID 2 system include the large number of disks needed and the high ratio of error-detection-and-correction bit storage disks to data storage disks. In addition, because each of the disks is accessed essentially in unison to read or write a block of data, effectively there is only a single actuator for all disks. As a result, the performance of the system for random reads of small files is degraded.

RAID 3 systems are based on the idea that a typical storage unit has internal means for determining data or system errors. Accordingly, the location of an error can be determined by the storage unit itself, and parity checking, a simpler form of error correction, can be used. RAID 3 systems, like RAID 2 systems, use a separate storage unit to store each bit in a word of data. The contents of these storage units are "Exclusive OR'd" ("XOR'd") to generate parity information, which is stored on a single extra storage unit. If any storage unit fails, the data on the failed storage unit can be reconstructed by XOR'ing the data on the remaining storage units with the parity information. RAID 3 systems require a smaller ratio of redundancy storage units to data storage units than RAID 2 systems. However, because data is stored bitwise, RAID 3 systems suffer the same performance degradation as RAID 2 systems for random reads of small files.

RAID 4 systems improve on the performance of RAID 3 systems by parceling data among the data storage units in amounts larger that the single bits used in RAID 3 systems. In RAID 4 systems, the size of such a "block" of data is typically a disk sector. Parceling data out in such blocks is also referred to as "block striping." For each "stripe" of data, a parity block is stored on a single, extra, storage unit designated as the parity unit.

A limitation of RAID 4 systems is that every time data is written to any of the independently operating data storage units, new parity information must also be written to the parity unit. The parity information stored on the parity unit must be read and XOR'd with the old data (to remove the information content of the old data in the parity data), and the resulting sum must be XOR'd with the new data (to calculate the new parity information). The new data and the new parity information must then be written to the respective data and parity storage units. This process is referred to as a "Read-Modify-Write" process.

Accordingly, a read and a write occur at the parity unit every time a data record is changed on any of the data storage units. Thus the parity unit becomes a potential bottleneck in a RAID 4 system.

RAID 5 systems use the same block size and parity error correction concepts as RAID 4 systems. However, instead of having a single storage unit dedicated to storing parity information, in a RAID 5 systems, the parity information is distributed among all the storage units in the system.

RAID 5 systems use the concept of a "redundancy group." A "redundancy group" is a set of "N+1" storage units. Each of the storage units is divided into a number of equally sized address areas called "blocks." Each storage unit usually contains the same number of such blocks. Blocks from each storage unit in a redundancy group having the same range of addresses are called "stripes." Each "stripe" of blocks in the redundancy group contains "N" blocks of data and one ("+1") block of parity data. The location of the block of parity data changes from one stripe to the next. For example, for a RAID 5 system with a redundancy group consisting of five disk drives, the parity data for the first stripe might be stored on the first disk drive, the parity data for the second stripe on the second disk drive, and so on. The parity block thus traverses the disk drives in a helical pattern.

Since no single storage unit is used to store all of the parity data in a RAID 5 system, the single storage unit bottleneck of RAID 4 systems is alleviated. However, each time data is written to any of the data blocks in a stripe, the parity block must still be read-modified-and-written as in RAID 4.

RAID 5 systems provide the capability for reconstructing one block of corrupted data for every stripe. The corruption of a block of data might result from a local failure confined to a specific sector of a storage unit (for example, a dust particle interfering with a read-write head or from a single disk sector going bad) or from the failure of a storage unit as a whole (resulting, for example, from a head crash or controller failure).

When a response to a read request to a prior art RAID 5 system results in a localized block input-output error, the RAID 5 system typically retries an unsuccessful read of data in a block several times before the RAID 5 system determines that the block is irretrievably bad. Once such a determination is made, the RAID 5 system issues a read request from the other storage units in the redundancy unit for the other blocks in the affected stripe. The missing data is then reconstructed by XOR'ing the good data, and the reconstructed data is then delivered by the RAID 5 system to the device that issued the read request. Thus a block IO failure in prior art RAID 5 systems results in a significant delay before the reconstructed requested data can be delivered as compared to the time required to deliver requested data when there is no IO failure. In addition, the reconstruction process requires that multiple IO requests be issued for each IO request that fails. Accordingly, the reconstruction process ties up system resources and reduces the data throughput of the storage system.

If an entire storage unit fails in a RAID 5 system, a replacement unit can be substituted and the lost data reconstructed, stripe by stripe. In a RAID system disclosed in U.S. Pat. No. 5,208,813, data from a failed storage unit may be read while reconstruction of the data onto the replacement storage unit is taking place. In this prior art system, data is reconstructed stripe by stripe. When a read request is received for data from a block of data from a storage unit other that the failed storage unit, the block of data is read from the appropriate storage unit in the normal manner. When a read request is received for data from a block on the failed storage unit, however, the system issues read requests for all the other data blocks and the parity block for that stripe from the other, functioning storage units. The system then reconstructs the corrupted data, and delivers it to the requesting data processing system.

Prior art RAID systems thus reconstruct data only when the system determines, after multiple read attempts or other means, that a sector of a disk is bad, or, alternatively, if system determines, after a predetermined number of unsuccessful IO operations to the same storage unit or other means, that an entire storage unit has failed. In both cases, in order to deliver the requested data, the system performs additional steps that are not performed during normal operation. Because of the overhead associated with making these determinations and performing these additional steps, delivery of reconstructed corrupted data imposes time delays as compared to delivery of uncorrupted data. In addition, the reconstruction process ties up system resources, decreasing the data throughput of the data storage system. Thus, prior art systems are not able to reliably deliver continuous, high bandwidth, uninterrupted, and undelayed streams of information.

U.S. Pat. No. 5,278,838 issued to Ng et al discloses a method for rebuilding lost data in a RAID system while reducing interference with normal data recovery and storage operations.

U.S. Pat. No. 5,315,602 issued to Noya et al. discloses a system for reducing the number of I/O requests required to write data in a RAID system.

U.S. Pat. No. 5,305,326 issued to Solomon et al. discloses a method for handling reconstruction of data after a power failure, for example after a power failure of an I/O processor in a RAID system.

U.S. Pat. No. 5,303,244 issued to Watson discloses a method for mapping logical RAID storage arrays to physical disk drives.

U.S. Pat. No. 5,235,601 issued to Stallmo et al. discloses a method for restoring valid data in a RAID system after a write failure caused by a storage unit fault.

U.S. Pat. No. 5,233,618 issued to Glider et al. discloses a method and apparatus for detecting and reconstructing incorrectly routed data, for detecting when a failure in writing a block of data has occurred, and for reconstructing the lost data.

U.S. Pat. No. 5,287,462 issued to Jibbe et al. discloses an apparatus for coupling a host bus with a number of storage array busses in a RAID system.

U.S. Pat. No. 5,124,987 issued to Milligan et al. discloses a disk drive array in which updates of redundancy data are eliminated by writing modified "virtual track instances" into logical tracks of the disks comprising a redundancy group.

U.S. Pat. No. 5,088,081 issued to Farr discloses a RAID system in which reconstructed data from a bad data block are stored on a "reserve disk."

U.S. Pat. No. 4,761,785 issued to Clark et al. discloses a storage management system in which parity blocks are distributed among a set of storage devices instead of being stored in a single storage device.

SUMMARY OF THE INVENTION

The present invention comprises a method and apparatus for providing transparent, real time reconstruction of corrupted data from a redundant array of storage units in a manner that imposes no performance degradation for reconstruction of such corrupted data and that does not tie up system resources. The present invention is particularly suited to applications in which data is retrieved from storage equipment in approximately equally sized parcels. Parcel sizes typically range in size from about 2 kilobytes ("KB") for record oriented database applications to 256 KB and more for video servers and other systems that retrieve data from storage in large, continuous streams. Each parcel is divided into "N" blocks of data. An "N+1st" parity block for each parcel is derived based on the content of the "N" blocks of data. The "N" blocks of data and the parity block for each parcel are stored in stripes of blocks in a redundancy group consisting of "N+1" data storage units. Data is read from the storage units an entire stripe at a time.

To read a stripe, a read request is concurrently sent to each storage unit in the redundancy group, requesting the block of data in that storage unit that corresponds to the stripe being read. Each storage unit independently processes the read request it has received and sends back the requested block as soon as it has been read. In one embodiment, if the first "N" blocks that are received include the parity block (indicating that the outstanding "N+1st" block is a data block), the "N" received blocks are XOR'd together to reconstruct outstanding "N+1st" block.

Each storage unit may complete its requested read operation at a slightly different time from the other storage units, even when there are no failures in any of the storage units. If an input/output failure does occur in one of the storage units, the delivery of the requested data from that storage unit is lost or significantly delayed. In either case, when "N" blocks have been retrieved, they are either immediately delivered to the requesting system (if all "N" blocks are data blocks) or immediately XOR'd (if one of the "N" blocks is the parity block). In the latter case, the received data blocks and the XOR'd sum, representing a reconstruction of the outstanding "N+1st" data block, are delivered to the requesting device or process. The same procedure is used each time data is read. The system of the present invention thus delivers data at a consistent rate regardless of whether a storage unit failure occurs.

BRIEF DESCRIPTION OF THE DRAWINGS

FIG. 3 is a timing table showing steps performed in a redundant array storage system of the prior art.

FIG. 4 is a timing table showing steps performed in one embodiment of the present invention.

DETAILED DESCRIPTION OF THE INVENTION

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Figure 1:
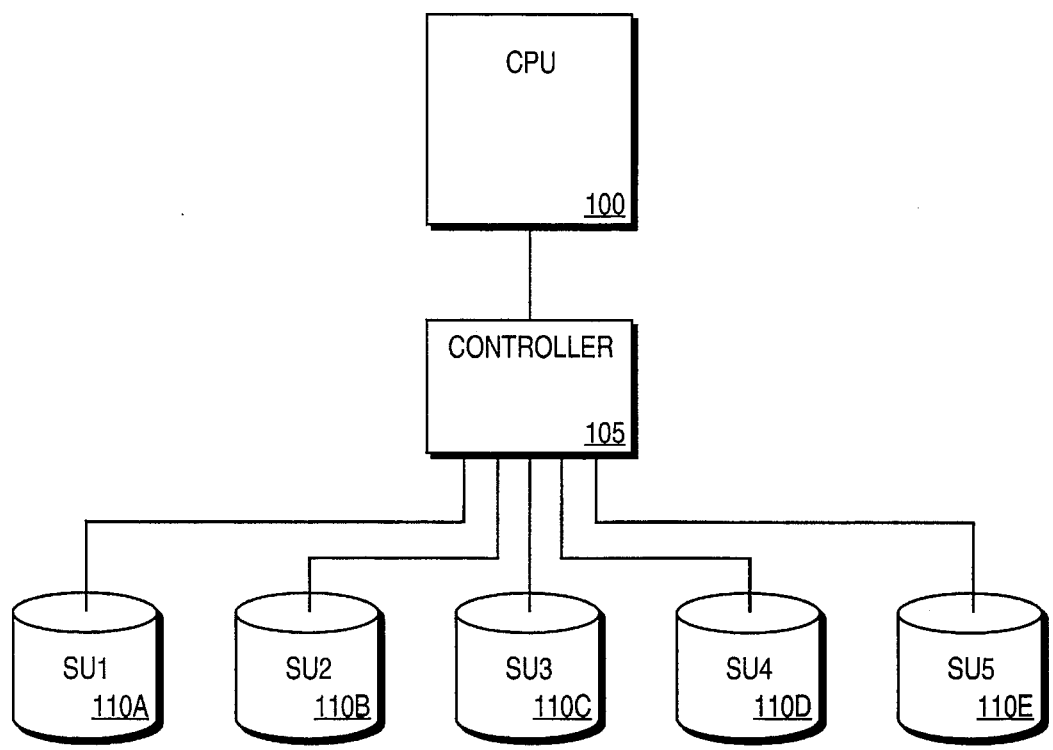
FIG. 1 is a schematic diagram of an example array of storage units that can be used with the present invention.

FIG. 1 is an example of a data storage system that may be used with the present invention. The system shown in FIG. 1 consists of a central processing unit ("CPU") 100, a controller 105, and storage units "SU1" to "SU5", identified by numerals 110A to 110E, respectively. CPU 100 may be any data processing device that has a need to store and/or retrieve data from data storage units. Storage Units SU1 to SU5 may be any devices capable of storing and retrieving data, including solid state memories, magnetic tape drives, and magnetic, optical, and magneto-optical disk drives. Although the system shown in FIG. 1 includes five storage units, the present invention may be used with any number of storage units. Controller 105 controls the operation of storage units SU1 to SU5. Depending on the implementation, the amount of intelligence of controller 105 may vary, and controller 105 may range from a simple hard-disk drive controller to a sophisticated data processing device in its own right that performs higher level disk and data storage management functions.

Figure 2:
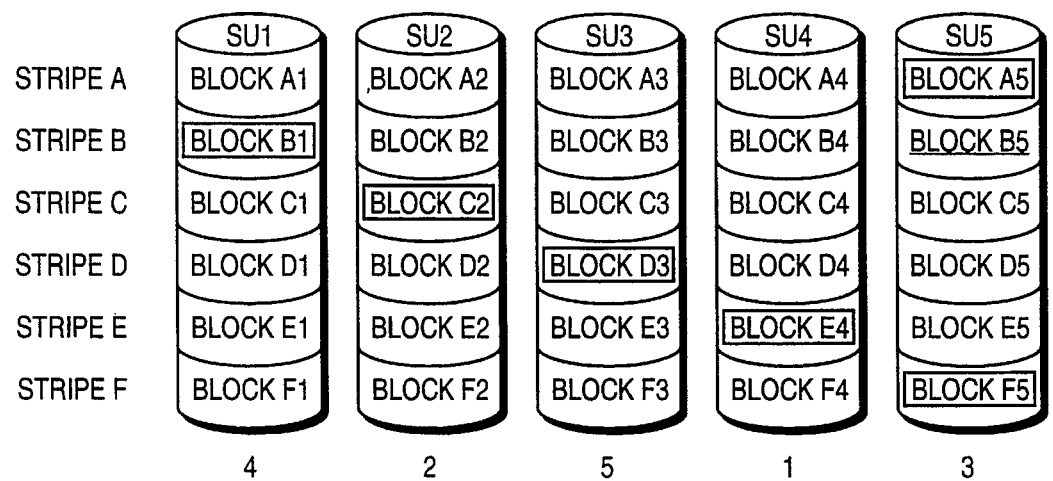
FIG. 2 is a schematic diagram of "block striping" that may be used with the storage units of FIG. 1.

FIG. 2 shows how the array of storage units SU1 to SU5 in FIG. 1 can be used to provide a redundant, RAID 5 -type data storage system. In RAID 5 systems, data is distributed among data storage units in a "redundancy group" through the use of "block striping." A "redundancy group" is a group of similar storage units that are operated together in a manner that provides redundancy should any one storage unit within that group fail. In the example of FIG. 2, storage units SU1 to SU5 comprise a redundancy group. "Block striping" refers to a technique in which data storage units of the redundancy group are divided into "stripes" of equally sized "blocks." In the example of FIG. 2, each of the storage units SU1 to SU5 is shown divided into six blocks labeled "A" through "F" for each storage unit. Thus the blocks for storage unit SU1 are labeled "A1" through "F1," the blocks for storage unit SU2 are labeled "A2" through "F2," the blocks for storage unit SU3 are labeled "A3" through "F3," the blocks for storage unit SU4 are labeled "A4" through "F4," and the blocks for storage unit SU4 are labeled "A5" through "F5."Block sizes typically range from the size of an individual disk sector (about 512 bytes) to sizes of 64 KB. and more in certain embodiments of the present invention. A storage unit typically has a capacity of tens of thousands of blocks and more. For clarity, however, only six blocks are shown for each storage unit in FIG. 2.

A "stripe" of blocks consists of a set containing a corresponding block from each of the storage units in a redundancy group. For example, the first blocks of storage units SU1 to SU5 are blocks A1, A2, A3, A4 and A5, respectively. The set of blocks A1, A2, A3, A4 and A5 is thus the first "stripe" of the redundancy group. This stripe is labeled "Stripe A" in FIG. 2. In a similar manner, the second stripe of the redundancy group, "Stripe B," consists of blocks B1, B2, B3, B4 and B5, "Stripe C" consists of blocks C1, C2, C3, C4 and C5, "Stripe D" consists of blocks D1, D2, D3, D4 and D5, "Stripe E" consists of blocks E1, E2, E3, E4 and E5, and "Stripe F" consists of blocks F1, F2, F3, F4 and F5.

Each stripe of the redundancy group of FIG. 2 includes four blocks of data and one block of parity information. In FIG. 2, a rectangle around the label of a block indicates that the block is a parity block. For stripe "A" in FIG. 2, actual data is stored in blocks A1, A2, A3 and A4, while parity information is stored in block A5. The parity information stored in the parity block of a stripe in a RAID 5 system typically consists of the XOR'd sum of the data blocks in the stripe. In the example of FIG. 2, the parity information stored in block A5 consists of the XOR'd sum of data blocks A1, A2, A3 and A4.

In a RAID 5 system, the parity information is not all stored in the same storage unit (as in RAID 4 systems) but is alternately stored on each of the storage units in a redundancy group in a generally predetermined pattern. In the example of FIG. 2, the parity information for stripes "A" and "F" is stored on storage unit SU5, for stripe "B" in storage unit SU1, for stripe "C" in storage unit SU2, for stripe "D" in storage unit SU3, and for stripe "E" in storage unit SU4. The parity block thus "precesses" around the storage units in a helical pattern.

In the prior art, RAID 5 systems are used to store on-line databases which consist of large numbers of individual records. A typical read request thus results in the retrieval of a relatively small amount of data. Data is retrieved from the data storage units one or two blocks of information at a time. During a read request, the parity block of a stripe is read only if a problem has occurred in the reading of the data blocks for which a read request has been made (as opposed to a write request, where the parity information for a stripe must be must be read, modified, and rewritten whenever the data in any of the blocks of a stripe is changed). If an attempt to read a particular block of data fails, several attempts to re-read are made. Only when it appears that the block is irretrievably corrupted is the data in the block reconstructed by reading the parity information for the parity block for the corrupted block's stripe and XOR'ing it with the remaining data blocks in the stripe. After the remaining data blocks and the parity block have been XOR'd together, the resulting reconstructed, originally requested data block is delivered to the requesting device.

FIG. 3 is a timing table showing steps performed in a prior art system using the redundancy group of FIG. 2 to read four individual blocks of data, one of which has become corrupted and unreadable. The four data blocks used in this prior art example are blocks A3, D1, B5 and A4. Of these, the corrupted data block is block B5 (indicated by underlining in FIG. 2).

In FIG. 3, the left hand column lists time increments T1, T2, T3, etc., while the right hand column lists the action performed during each time increment. The time increments are not necessarily of equal length.

As shown in FIG. 3, delivery of an uncorrupted data block such as the first data block A3 is a three step process. A request to read block A3 is made by a requesting device at time T1. At time T2, block A3 is read from the appropriate data storage unit, in this case, storage unit SU3. At time T3, the data in block A3 is delivered to the requesting device.

The second block requested in the example of FIG. 3 is also uncorrupted. Accordingly, the same three step process is repeated at times T4, T5 and T6 for the second data block DI: a request to read block D1 is made, block D1 is read from the storage unit SU1, and the data in block D1 is delivered.

Data from uncorrupted data blocks can therefore be delivered, in this example, at a rate of one data block every three time increments.

When a corrupted data block such as data block B5 is encountered, extra steps have to be taken and the steady flow of data is interrupted. The steps involved in reading corrupted data block B5 occur over time increments T7 to T14 in FIG. 3. As for the previous two data blocks, the first step is that a read request for block B5 is made at time T7. In response to the read request, an attempt to read block B5 from storage unit SU5 is made at T8. Because block B5 has been corrupted, however, the first read attempt is unsuccessful. Two additional attempts to read block B5 are made at times T9 and T10. After these three unsuccessful read attempts, a read failure is reported. At this point, reconstruction of corrupted data block B5 is initiated. For a system having a general configuration similar to the configuration shown in FIG. 1, the reconstruction procedure, depending on the specific implementation, may be controlled either by the controller 105 or by the CPU 100.

The reconstruction process occurs over time increments T12, T13, and T14 in FIG. 3. At time T12, the remaining blocks in stripe "B" (the stripe in which corrupted data block B5 is located), namely parity block B1 and data blocks B2, B3 and B4 are read from storage units SU1, SU2, SU3 and SU4, respectively. After blocks B1, B2, B3 and B4 have been read from the respective storage units, these blocks are XOR'd together at time T13 to yield a reconstructed data block B5. The reconstructed data block B5 is then delivered to the requesting device at time T14.

The fourth data block in this example, block A4, is uncorrupted. The same three step process is followed to request, read, and deliver block A4 over time increments T15, T16, and T17, respectively as was followed for uncorrupted data blocks A3 and D1.

Unlike the three step procedure for delivering uncorrupted data blocks A3, D1, and A4, delivery of reconstructed data block B5 involves the extra steps of making repeated read attempts, reporting a read failure, initiating the reconstruction process, reading remaining blocks in the stripe, and XOR'ing the remaining blocks to reconstruct the corrupted block. These extra steps increase the time period from the time a read request of the corrupted block is made to the time the reconstructed block is finally delivered. Accordingly, there is a difference in the time required to deliver an uncorrupted block versus delivering a corrupted block. Data delivery is delayed.

In addition to an individual block IO failure, data storage units are also susceptible to catastrophic failure at finite failure rates. In a data storage system that consists of a large number of data storage units that are on-line continuously for long periods of time, catastrophic failure of entire storage units occurs at predictable rates. The failure of an entire storage unit within a redundancy group increases the number of data reconstructions that are necessary, as such reconstruction is required for every read request for a data block on the failed storage unit.

To provide acceptable performance for systems that deliver continuous data streams at high rates, a redundant data storage system must be able to deliver reconstructed data upon a local read failure, or upon an entire storage unit failure, with substantially no delay over the rate at which uncorrupted, unreconstructed data is delivered.

The present invention overcomes the limitations of the prior art by providing real-time reconstruction of corrupted data for high data transfer rate continuous stream data storage systems and other systems in which data can be read from a redundancy group an entire stripe at a time.

In high data transfer rate systems, input/output to storage systems is most efficiently done in large, sequential, chunks. For example, for the redundancy group shown in FIG. 2, a portion of a video program may be stored, sequentially, in stripes "A" to "F." Each stripe contains four data blocks and one parity block. Stripes "A" to "F" thus contain a total of twenty-four data blocks. The size of each block, in one embodiment of the present invention is 64 kilobytes ("KB")(in other embodiments, 32 KB and smaller block sizes are used). For this embodiment, each stripe thus contains four blocks of 64 KB each, or a total of 256 KB of data. The sum of stripes "A" to "F" is six times 256 KB, or 1.536 megabytes ("MB" ) or 12.288 megabits ("Mb") of data. For video data transferred at a rate of approximately 1.5 megabits per second, stripes " A" to "F" thus contain approximately 8 seconds of video data.

In the storage system of the present invention, data is stored and retrieved from a redundancy group of data storage units in increments of a stripe at a time, which in this example totals 256 KB, stored in four blocks of 64 KB each. The fifth block of each stripe is a parity block that contains the XOR'd sum of the four data blocks in the stripe. To read the portion of the video program stored in stripes "A" to "F"

of FIG. 2, read requests are first simultaneously issued for all the blocks in stripe "A", namely blocks A1, A2, A3, A4 and A5. These read requests, depending on the embodiment, may be issued by a process running in a data processing device or by an intelligent storage unit controller.

A read request for block A1 is issued to storage unit SU1, a read request for block A2 is issued to storage unit SU2, a read request for block A3 is issued to storage unit SU3, a read request for block A4 is issued to storage unit SU4, and a read request for block A5 is issued to storage unit SU5, all simultaneously. The requested data blocks are not always delivered at the same time. Instead, they are spread over some time period. In one embodiment of the present invention, as soon as a block is received, it is stored in a buffer, and a check is made to determine whether received block is the next to last block in the stripe (i.e. the fourth block in this example). If the most recently received block is the next to last block (indicating that all but one of the blocks of the stripe have been received), a further check is made to determine whether all of the received blocks are data blocks or whether, instead, one of them is the parity block. If the first four blocks are all data blocks, all data blocks of the stripe have been received, and they are delivered to the requesting device or process. If one of the first four blocks is the parity block for the stripe, then the block that is still outstanding is a data block. Rather than continue to wait for the outstanding block, the present invention reconstructs the missing block by XOR'ing the three data blocks and the parity block that have already been received. The three received data blocks, together with the XOR'd sum of those three blocks and the parity block, are delivered to the requesting device or process. Because a stripe contains four data blocks and a parity block that contains the XOR'd sum of the four data blocks, the XOR'd sum of any four out of five blocks of a stripe is the same as the fifth block, regardless of the order in which the blocks are received. Accordingly, with the present invention, there is no need to wait for the fifth and last block to be delivered, regardless of the reason for the fifth block's delay.

In the example of FIG. 2, stripe "A" does not contain any corrupted blocks. Accordingly, the order in which blocks are received from each of the storage units SU1 to SU5 in response to simultaneous read requests issued to each of the respective storage units primarily depends on the relative characteristic response times of the storage units. For purposes of this example, it is assumed that the order of relative characteristic response times of the storage units, from fastest to slowest, is SU4, SU2, SU5, SU1, and SU3. It is accordingly also assumed that, in the absence of any corrupted blocks or other irregularities, for simultaneously issued read requests, storage unit SU4 delivers the requested block first, followed by storage units SU2, SU5, SU1 and SU3, respectively. The numbers under each of the storage units SU1 to SU5 in FIG. 2 indicate the relative performance of the storage units.

FIG. 4 is a timing table that shows the actions that occur in the present embodiment of the present invention when reading stripes "A" to "D" of FIG. 2. The first column in FIG. 4 specifies the relative time interval of an action. The second column of FIG. 4 identifies the action performed during the specified time interval. The third column of FIG. 4 lists the blocks that have been stored in a buffer as of the end of the specified time interval.

As indicated in FIG. 4, the first action taken at time T1 is that simultaneous requests are made to storage units SU1 to SU5 to read the block of each storage unit that corresponds to stripe "A," namely, blocks A1 to A5, respectively. As shown in FIG. 2, there are no corrupted blocks in stripe "A." Accordingly, the blocks are received from the storage units based on the performance characteristics of the storage units. Given the assumed relative performance specified in FIG. 2, the first block that is received in response to simultaneous read requests for each of the blocks in stripe A of FIG. 2 is block A4 from the quickest responding storage unit SU4. As shown in FIG. 4, block A4 is received and stored at time T2.

The second fastest storage unit is storage unit SU2. Accordingly, the second block that is received from stripe "A" is block A2 from storage unit SU2. As shown in FIG. 4, block A2 is received and stored at time T3. At the end of time interval T3, blocks A4 and A2 have been received and stored in a buffer, as shown in the third column of FIG. 4.

The third fastest storage unit is storage unit SU5. Accordingly, the third block that is received from stripe "A" is block A5 from storage unit SU5. As shown in FIG. 2, block A5 is the parity block for stripe "A." In FIG. 4, a parity block is indicated by tinderlining. As shown in FIG. 4, block A5 is received and stored at time T4. At the end of time interval T4, blocks A4, A2 and A5 have received and stored, as shown in the third column of FIG. 4.

The fourth fastest storage unit is storage unit SU1. Accordingly, the fourth block that is received from stripe "A" is block A1 from storage unit SU1. As shown in FIG. 4, block A1 is received and stored at time T5. At the end of time interval T5, blocks A4, A2, A5 and A1 have been received and stored, as shown in the third column of FIG. 4.

As soon as four out of five blocks of a stripe have been received, a check is made to determine whether all of the first four received blocks are data blocks, as opposed to parity blocks. Here, only three of the first blocks are data blocks, since the third block that was received is the parity block A5. Since the first four blocks are not all data blocks, one data block, in this case block A3, remains outstanding. Accordingly, the four received blocks are XOR'd together at time T6 to reconstruct the outstanding fifth block, A3. This reconstructed block is stored in a buffer along with the four received blocks. At the end of time interval T6, blocks A4, A2, A5, A1, and reconstructed block A3 have been received and stored, as shown in the third column of FIG. 4. In FIG. 4, a reconstructed block such as block A3 is indicated by being enclosed in brackets (e.g. "[A3]"). After the first four blocks have been received and XOR'd, the three received data blocks A4, A2, and A1, and the reconstructed fourth data block [A3,] are delivered to the device that requested the reading of the stripe. As shown in FIG. 4, this delivery for stripe "A" takes place at time T7. For a stripe such as stripe "A" of FIG. 2 that does not contain any corrupted data blocks, reading and delivering all of the blocks in the stripe takes place over a time equal to the sum of the time intervals T1 to T7.

The next seven time interval lines in FIG. 4, T8 to T14, indicate the actions that are performed when reading a stripe such as stripe "B" in which one of the blocks (in this case block B5) has become corrupted. At time T8, as was also done at time T1 for stripe "A," read requests are simultaneously issued to storage units SU1 to SU5 for all of the blocks, namely blocks B1 to B5, of stripe "B." The fastest storage unit is still storage unit SU4, so the first block returned is block B4. As shown in FIG. 4, block B4 is received and stored at time T9.

The second fastest storage unit is again storage unit SU2. The second block that is received is accordingly block B2. As shown in FIG. 4, block B2 is received and stored at time T10.

As indicated by underlining in FIG. 2, block B5 on storage unit SU5 is corrupted. Accordingly, storage unit SU5's attempt to read block B5 fails. Having failed in its first attempt to read block B5, storage unit SU5 may attempt to read block B5 a second time. In any case, because of the corruption block B5, storage unit SU5 cannot deliver block B5 at the time that it would be able to deliver an uncorrupted data block. Even though storage unit SU5 is normally the third fastest storage unit, in this case, it is not the third storage unit to deliver a block in the requested stripe.

Because of the delay in delivering block B5 from storage unit SU5, the third block that is received is parity block B1 from storage unit SU1. As shown in FIG. 4, parity block B1 is received and stored at time T11. Because of the continued inability of storage unit SU5 to deliver block B5, the fourth block that is received is block B3. As shown in FIG. 4, block B3 is received and stored at time T12.

As soon as blocks B4, B2, B1 and B3 have been received, a check is made to determine whether or not all of the received blocks are data blocks. Since one of the received blocks is parity block B1, the received blocks are not all data blocks. Accordingly, they are XOR'd together at time T13 to produce reconstructed data block [B5]. The three received data blocks B2, B3 and B4 and the reconstructed data block [B5] are then delivered to the device or process that requested the reading of stripe "B" at time T14. For a stripe such as stripe "B" of FIG. 2 that contains a corrupted data block, reading and delivering all of the blocks in the stripe takes place over a time equal to the sum of the time intervals T8 to T14. Comparing the actions taken over the seven time intervals T8 to T14 to the actions taken over the seven time intervals T1 to T7 for stripe "A" (which does not contain any corrupted blocks), it can be seen that the actions taken in both cases, and therefore the elapsed time, are essentially the same. Accordingly, the present invention is able to deliver all of the blocks of stripe "B" at the same rate it was able to deliver all of the blocks of stripe "A," even though one of the blocks of stripe "B" was corrupted.

In addition to delays in the delivery of a requested block by a storage unit because of corruption of the data block, delays may also occur when a storage unit performs a periodic self-diagnostic or other system function. For example, hard disk storage units commonly undertake a process known as thermal calibration every few minutes or so. During this process, the disk goes off line and becomes unresponsive for a few seconds while it re-calibrates. The present invention also compensates for delays induced by such storage unit system processes. For example, in FIG. 4, it is assumed that storage unit SU4 is undergoing such a system process while stripe "C" is being read during time intervals T15 to T21. Because of this system process, storage unit SU4, which is normally the fastest-to-respond storage unit, instead becomes the slowest storage unit. The first four blocks that are received at time intervals T16, T17, T18 and T19 in response to the simultaneous read requests for all blocks in stripe "C" at time T15 are therefore parity block C2, and data blocks C5, C1 and C3, respectively. Since the outstanding block is a data block, these four blocks are XOR'd together at time T20 to reconstruct outstanding data block C4. The three received data blocks C1, C3 and C5, as well as reconstructed data block [C4], are delivered at time T21. The actions performed over the seven time intervals T15 to T21, and the elapsed time, are again essentially the same as for the seven time intervals T1 to T7 during which the blocks in stripe "A" were read and delivered.

With respect to the reading of stripe "D" over time intervals T22 to T28 in FIG. 4, it is assumed that a catastrophic failure has occurred to storage unit SU1, and that it is now no longer possible to obtain any data from storage unit SU1. Because storage unit SU1, which is normally the fourth fastest storage unit, is no longer functioning, the first four blocks that are received in response to simultaneous read requests for blocks D1 to D5 at time T22 are data blocks D4, D2, D5, and parity block D3. These blocks are received and stored at times T23, T24, T25 and T26, respectively, and, because the outstanding block is a data block, XOR'd at time T27. The three received data blocks D4, D2 and D5, as well as reconstructed data block [D1] from failed storage unit SU1, are delivered at time T28. The actions performed over the seven time intervals T22 to T27, and the elapsed time, are again essentially the same as for the seven time intervals T1 to T7 during which the blocks in stripe "A" were read and delivered.

As shown in FIG. 4, therefore, the present invention compensates for local data block failure, catastrophic storage unit failure, or storage unit system process delay in real time, without imposing any delay in the data stream being delivered.

Thus far, the present invention has been discussed with respect to the system of FIG. 2 which features five-block stripes composed of 64 KB blocks stored in five storage units. It will be evident to those skilled in the art that the present invention is not limited to this specific embodiment, but that any arbitrary number of blocks, storage units, and block size can be used. Furthermore, although the present invention has been described with respect to a RAID 5 type system, it can be implemented using a RAID 4 or other system architecture as well.

In the general case, the system of the present invention includes a redundancy group of "N+1" storage units. The storage area of each storage unit is segregated into a plurality of blocks such that each block of a storage unit has a corresponding block in each of the other storage units. The set comprising a block and the corresponding blocks in each of the other storage units is a "stripe." Typically, the block size is the same for all stripes. However, in some embodiments, different stripes may have different block sizes. This kind of an arrangement may be appropriate, for example, where different stripes store files of different types and/or sizes.

Within each stripe, "N" blocks store data, and one block is a parity block that stores parity information for the data blocks in the stripe. The parity information is typically the XOR'd sum of the data blocks in the stripe. Accordingly, the data in any block can be obtained by XOR'ing the data in each of the other blocks. The parity blocks for different stripes may be stored in a dedicated one of the "N+1" storage units, as in a RAID 4 system, or the parity block may be distributed among the storage units as, for example, in a RAID 5 system.

As in the five storage unit system of FIG. 2, in an "N+1" storage unit system of the present invention, each read operation reads an entire stripe at a time. Read requests for each block in the stripe are simultaneously issued to each of the respective storage units in the redundancy group. As soon as "N" blocks (that is, all blocks in the stripe but one) have been received, a check is made to determine whether the "N" received blocks are all data blocks. If they are, they are immediately delivered to the requesting device or process. If one of the first "N" blocks is the parity block, then only "N−1" data blocks have been received, and a data block remains outstanding. Accordingly, the parity block and the "N−1" received data blocks are XOR'd together to reconstruct the missing data block. The "N–1" received data blocks and the XOR'd sum representing the reconstructed missing data block are delivered to the requesting device or process. The "N+1st" block, whenever it is a data block, is therefore always reconstructed on the fly. The reconstructed block is delivered regardless of whether or not the delayed arrival (as compared to the preceding "N" blocks) of the "N+1st" block was caused by any system or storage unit process or failure, or any other reason. Thus the process steps performed by the system, and the rate at which requested data is delivered, remain essentially constant regardless of whether any read failure occurs.

In one embodiment of the present invention, after it has been determined that the first "N" received blocks are not all data blocks, and before XOR'ing them together to reconstruct the outstanding "N+1st" block, a last minute check is made to determine whether the "N+1st" block has been received, thereby avoiding the need to perform the XOR'ing process. A flow chart for this embodiment is shown in FIG. 6.

Figure 6:
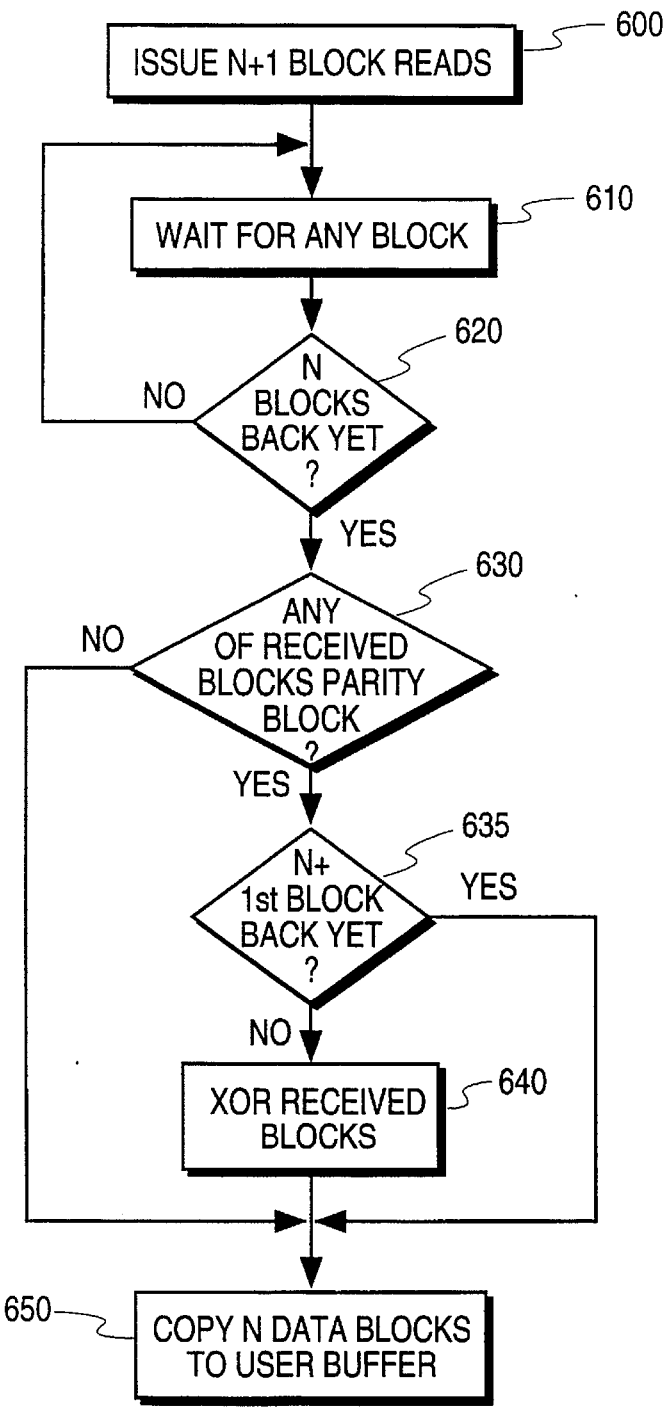
FIG. 6 is a flow chart for one embodiment of the present invention.

As shown in FIG. 6, in this embodiment, read requests for all "N+1" blocks ("N" data blocks and one parity block) in a stripe are issued at step 600, and the read blocks are awaited at step 610. After a block is received at step 610, a determination is made at step 620 as to whether "N" blocks (all of the blocks in the stripe but one) have been received. If not, the next block is awaited at step 610. If "N" blocks have been received, a determination is made at step 630 as to whether any of the "N" blocks that have been received is the parity block, which indicates that the outstanding block is a data block. If none of the received blocks is a parity block, the outstanding block is the parity block. Thus all of the data blocks of the stripe have already been received, and they can be placed in the user buffer at step 650. If one of the blocks that have been received is the parity block, then the outstanding block is a data block, which can be reconstructed by "XOR'ing" together the already received blocks. Prior to beginning the XOR process, however, a final check is made at step 635 to determine whether the "N+1st" has now arrived. The check may be made immediately, or a short, predetermined delay may be implemented to give the "N+1st" block a chance to arrive. If at step 635 it is determined that the "N+1st" block has arrived, the XOR'ing procedure is not needed and the "N" data blocks are delivered to the user buffer at step 650. If the "N+1st" block has not arrived, the "N" received blocks, consisting of the parity block and "N–1" data blocks, are XOR'd together at step 640 to obtain the last data block. The "N" data blocks, consisting of "N–1" received data blocks and one reconstructed data block, are copied to a user buffer at step 650.

Figure 7:
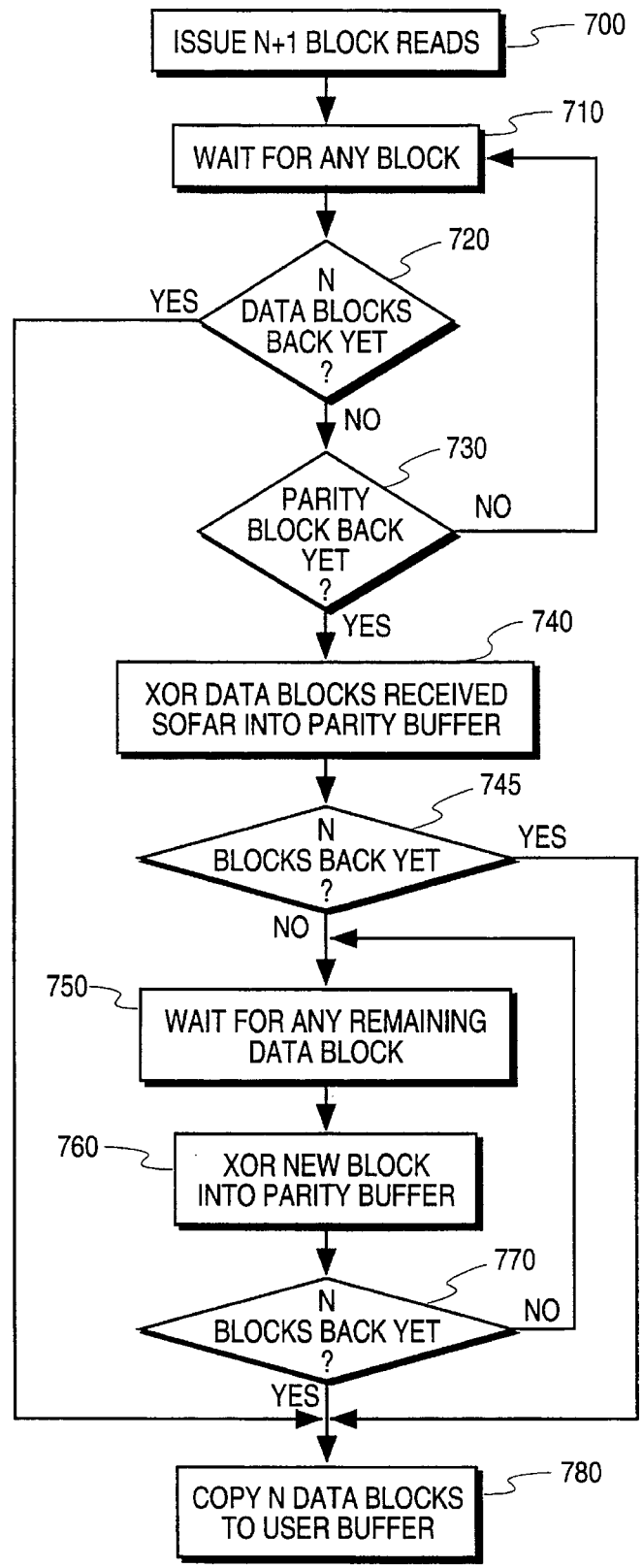
FIG. 7 is a flow chart for a second embodiment of the present invention.

The embodiment of FIG. 7 is similar to the embodiment of FIG. 6, except that the received blocks are monitored as they are received to determine whether any of the first "N" blocks received is the parity block. The XOR'ing of the received blocks is begun as soon as the parity block is received. As shown in FIG. 7, read requests for all "N+1" blocks in a stripe are issued at step 700, and the first resulting blocks are awaited at step 710. After a block is received, a check is made at step 720 to determine whether all "N" data blocks have been received. If all "N" data blocks have been received, the "N" data blocks are copied to a user buffer at step 780.

If all "N" data blocks have not yet been received, a check is made at step 730 to determine if the parity block has been received. If the parity block has not been received, further blocks are awaited at step 710. If the parity block has been received, any already received data blocks are XOR'd with the parity block and stored in the parity buffer at step 740. Thereafter, at step 745, a check is made if "N" blocks have been received. If "N" blocks have been received, then the XOR'd sum of those "N" blocks is equivalent to the outstanding data block, and all data blocks ("N–1" received data blocks and one reconstructed data block) are available for delivery, and they are delivered to the user buffer at step 780. If "N" blocks have not yet been received, additional blocks are awaited at step 750. Since at this point the parity block has been received, all remaining outstanding blocks are data blocks.

After the next data block is received, it is XOR'd into the parity buffer at step 760, which contains either the parity block (if the parity block was the first block that was received) or the XOR'd sum of the parity block and any previously received data blocks. A check is made a step 770 to determine whether "N" blocks have been received. If not, the next block is awaited at step 750. If it is determined that "N" blocks have been received at step 770, "N" data blocks are copied to the user buffer at step 780. These "N" data blocks consist of one reconstructed data block that is the XOR'd sum of the "N" received blocks and the "N–1" received blocks other than the parity block.

In addition to being suited for applications such as the delivery of continuous streams of data such as digitized video and/or audio, the present invention, with suitable choice of stripe, block, and redundancy group sizes, is suitable for any application in which data is retrieved in approximately equally sized parcels. In this general case, for a redundancy group comprising "N+1" data storage units ("N" storage units storing actual data and one storing parity information), the block size "B" and the number of data storage units "N" for storing actual data are such that the product of "B" and "N" equals the data parcel size "D." Thus "B" times "N" equals "D;" "D" divided by "B" equals "N;" and "D" divided by "N" equals "B."

For example, in record oriented database systems, data is commonly stored in 2 KB parcels. "D," in this example, thus equals 2 KB. A typical sector size in a data storage unit is 512 bytes. If the block size "B" of each storage unit is set at the size of a typical disk sector, 512 bytes, then the appropriate value for "N" is obtained by dividing 2 KB ("D") by 512 bytes ("B"). "N," accordingly, equals 4, and the total number of data storage units in an appropriate redundancy group is "N+1," or five. Thus a system of the present invention utilizing a redundancy group of five data storage units divided into 512 byte blocks is suitable for a database application that reads data in 2 KB amounts.

Figure 5:
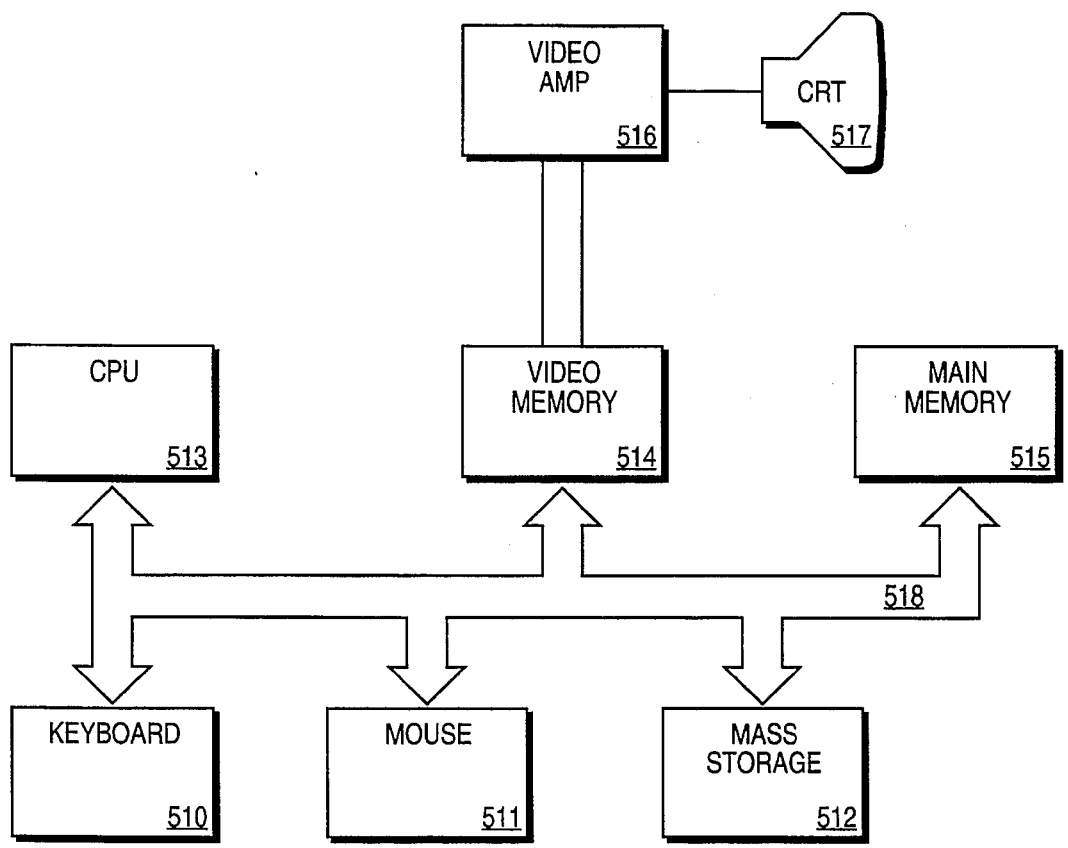
FIG. 5 is a block diagram of a computer system on which the present invention can be implemented.

The present invention can be implemented on a general purpose computer such as illustrated in FIG. 5. A keyboard 510 and mouse 511 are coupled to a bi-directional system bus 518. The keyboard and mouse are for introducing user input to the computer system and communicating that user input to CPU 513. The computer system of FIG. 5 also includes a video memory 514, main memory 515 and mass storage 512, all coupled to bi-directional system bus 518 along with keyboard 510, mouse 511 and CPU 513. The mass storage 512 may comprise multiple data storage units, and may include both fixed and removable media, such as magnetic, optical or magnetic optical storage systems or any other available mass storage technology. Bus 518 may contain, for example, 32 address lines for addressing video memory 514 or main memory 515. The system bus 518 also includes, for example, a 32-bit DATA bus for transferring DATA between and among the components, such as CPU 513, main memory 515, video memory 514 and mass storage 512. Alternatively, multiplex DATA/address lines may be used instead of separate DATA and address lines.

In one embodiment of this invention, tile CPU 513 is a 32-bit microprocessor manufactured by Motorola, such as the 680X0 processor or a microprocessor manufactured by Intel, such as the 80X86, or Pentium processor. However, any other suitable microprocessor, microcomputer, multi-processor, or other data processor may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the cathode ray tube (CRT) raster monitor 517. Video amplifier 516 is well known in the art and may be implemented by any suitable means. This circuitry converts pixel DATA stored in video memory 514 to a raster signal suitable for use by monitor 517. Monitor 517 is a type of monitor suitable for displaying graphic images.

The computer system described above is for purposes of example only. The present invention may be implemented in any type of computer system or programming or processing environment.

Thus a novel method and apparatus to provide real-time reconstruction of corrupted data has been presented. Although the invention has been described with respect to specific examples, it will be clear to those skilled in the art that the invention is not limited to these specific examples but extends to other embodiments as well. The present invention is intended to include all of these other embodiments.

We claim:

1. A computer-implemented method for providing real time reconstruction of corrupted data from a redundant array storage system containing "N+1" data storage units, comprising the steps of:

storing a first stripe of data comprising "N" blocks of data and one block of redundancy information on said "N+1" data storage units such that one of each of said "N" blocks of data is stored on each of "N" of said "N+1" data storage units and said block of redundancy information is stored on a remaining one of said data storage units;

issuing simultaneous read requests during normal system operation for all "N+1" blocks of said first stripe when any of said data stored in said first stripe is retrieved; and reconstructing an "N+1st" block of said first stripe from contents of a first "N" blocks received in response to said simultaneous read requests, said reconstructing step being performed only if after a predetermined amount of time, said "N+1st" block has not yet been received and one of said first "N" blocks received comprises said block of redundancy information.

2. The computer-implemented method of claim 1 wherein said one block of redundancy information comprises an XOR'd sum of the data contained in said "N" blocks of data.

3. The computer-implemented method of claim 2 wherein said step of reconstructing an "N+1st" block of said first stripe from contents of said first "N" blocks received in response to said simultaneous read requests is performed by XOR'ing said contents of said first "N" blocks as said first "N" blocks are received with an XOR'd sum of any previously received blocks.

4. The computer-implemented method of claim 1 wherein said step of issuing said simultaneous read requests is performed in response to a request from a process for retrieval of data stored in said first stripe and wherein an end of said period of time is determined by said process.

5. The computer-implemented method of claim 1 wherein said "N" blocks of data of said first stripe comprise a first portion of a file of data, a second portion of said file of data being stored on said data storage units in a second stripe of blocks contiguous to said first stripe of blocks.

6. The computer-implemented method of claim 1 wherein each of said blocks contains at least 32 KB of data.

7. The computer-implemented method of claim 1 wherein said storage units comprise disk drive storage units comprising storage media divided into sectors.

8. The computer-implemented method of claim 7 wherein each of said blocks of data contains an amount of data that can be stored in an integer multiple of said sectors.

9. The computer-implemented method of claim 8 wherein said integer multiple is 1.

10. The computer-implemented method of claim 1 wherein said step of issuing said simultaneous read requests is performed in response to a request from a process for retrieval of data stored in said first stripe.

11. The computer-implemented method of claim 10 wherein said process utilizes data in increments of a predetermined size.

12. The computer-implemented method of claim 11 wherein the amount of data stored in said "N" blocks of data of said first stripe is approximately equal to said predetermined size of one of said increments.

13. A redundant array of data storage system comprising:

"N+1" data storage units;

a first stripe of data comprising "N" blocks of data and one block of redundancy information stored on said "N+1" data storage units such that one of each of said "N" blocks of data is stored on each of "N" of said "N+1" data storage units and said block of redundancy information is stored on a remaining one of said data storage units;

means for issuing simultaneous read requests for all of said "N+1" blocks in said first stripe when any data stored in said stripe is retrieved; and means for reconstructing an "N+1st" block of said first stripe from a contents of a first "N" blocks received in response to said read requests only if after a predetermined amount of time, said "N+1st" block has not yet been received and one of said first "N" blocks received comprises said block of redundancy information.

14. The data storage system of claim 13 further comprising means for determining whether any block received in response to said read requests comprises said block of redundancy information.

15. The data storage system of claim 13 wherein said "N" blocks of data of said first stripe comprise a first portion of a file of data, a second portion of said file of data being stored on said data storage units in a second stripe of blocks contiguous to said first stripe.

16. The data storage system of claim 13 wherein each of said blocks contains at least 32 KB of data.

17. The data storage system of claim 13 wherein said data storage units comprise disk drive storage units comprising storage media divided into sectors.

18. The data storage system of claim 17 wherein each of said blocks of data contains the amount of data that can be stored in an integer multiple of said sectors.

19. The data storage system of claim 13 wherein said "N" blocks of data of said first stripe comprise a first portion of a file of data, a second portion of said file of data being stored on said data storage unit in a second stripe of blocks contiguous to said first stripe of blocks.

20. The data storage system of claim 19 wherein said file comprises video data.

21. An article of manufacture comprising a computer usable mass storage medium having computer readable program code means embodied therein for causing a processing means to provide real time reconstruction of corrupted data from a redundant array storage system containing "N+1" data storage units, said computer readable program code means in said article of manufacture comprising:

a means for storing a first stripe of data comprising "N" blocks of data and one block of redundancy information on said "N+1" data storage units such that one of each of said "N" blocks of data is stored on each of "N" of said "N+1" data storage units and said block of redundancy information is stored on a remaining one of said data storage units;

a means for issuing simultaneous read requests during normal system operation for all "N+1" blocks of said first stripe when any of said data stored in said first stripe is retrieved; and a means for reconstructing an "N+1st" block of said first stripe from contents of a first "N" blocks received in response to said simultaneous read requests only if after a predetermined amount of time, said "N+1st" block has not yet been received and one of said first "N" blocks received comprises said block of redundancy information.

22. The article of manufacture of claim 21 wherein said one block of redundancy information comprises an XOR'd sum of the data contained in said "N" blocks of data.

23. The article of manufacture of claim 21 wherein said means for reconstructing an "N+1st" block of said first stripe from contents of said first "N" blocks received in response to said simultaneous read requests further XOR's said contents of said first "N" blocks as said first "N" blocks are received with an XOR'd sum of any previously received blocks.

24. The article of manufacture of claim 21 wherein said means for issuing said simultaneous read requests performs in response to a request from a process for retrieval of data stored in said first stripe and wherein an end of said period of time is determined by said process.

25. The article of manufacture of claim 21 wherein said "N" blocks of data of said first stripe comprise a first portion of a file of data, a second portion of said file of data being stored on said data storage units in a second stripe of blocks contiguous to said first stripe of blocks.

26. The article of manufacture of claim 21 wherein each of said blocks contains at least 32 KB of data.

27. The article of manufacture of claim 21 wherein said storage units comprise disk drive storage units comprising storage media divided into sectors.

28. The article of manufacture of claim 27 wherein each of said blocks of data contains an amount of data that can be stored in an integer multiple of said sectors.

29. The article of manufacture of claim 28 wherein said integer multiple is 1.

30. The article of manufacture of claim 21 wherein said means for issuing said simultaneous read requests performs in response to a request from a process for retrieval of data stored in said first stripe.

31. The article of manufacture of claim 30 wherein said process utilizes data in increments of a predetermined size.

32. The article of manufacture of claim 31 wherein the amount of data stored in said "N" blocks of data of said first stripe is approximately equal to said predetermined size of one of said increments.

* * * * *